UNITED STATES PATENT OFFICE.

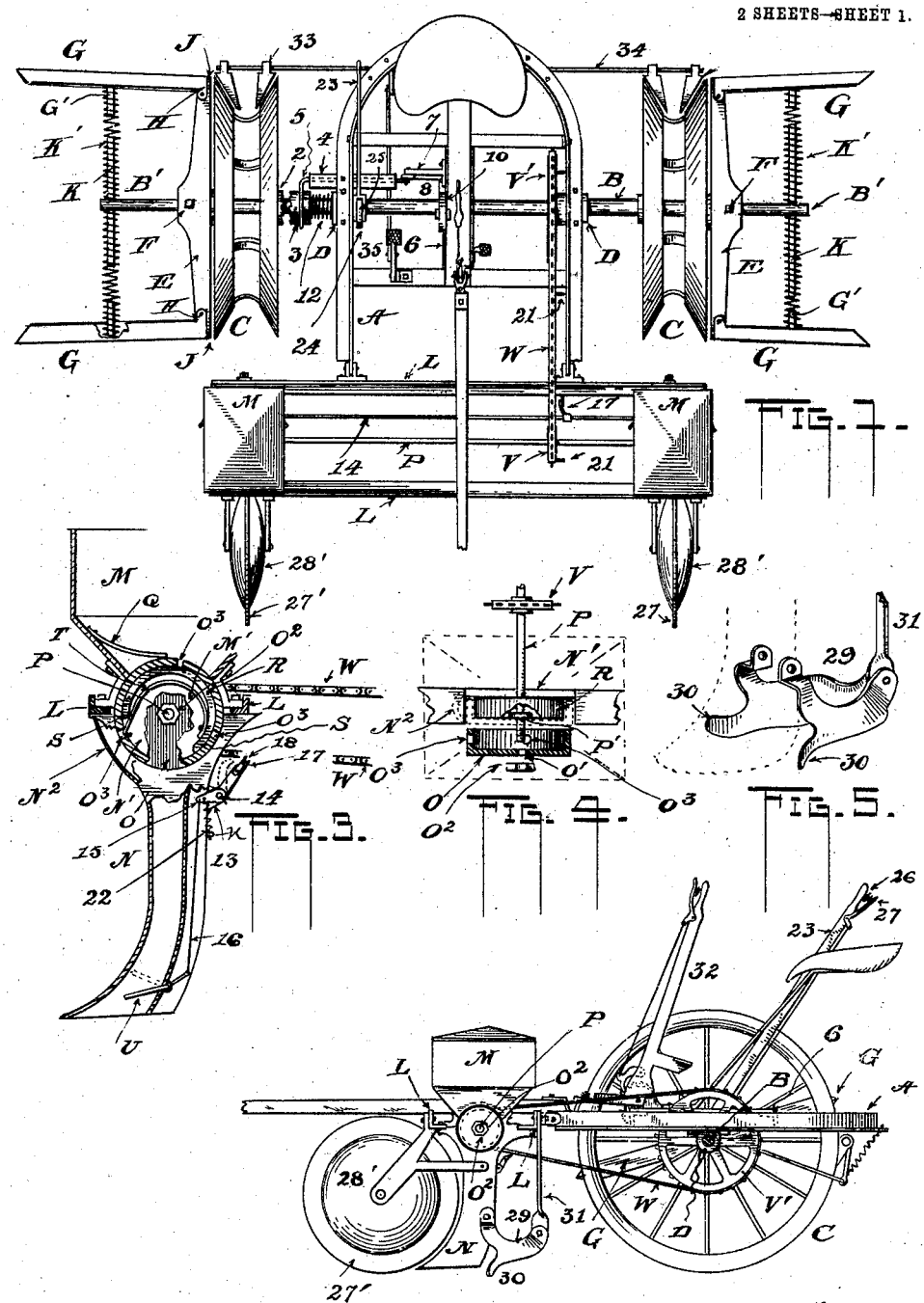

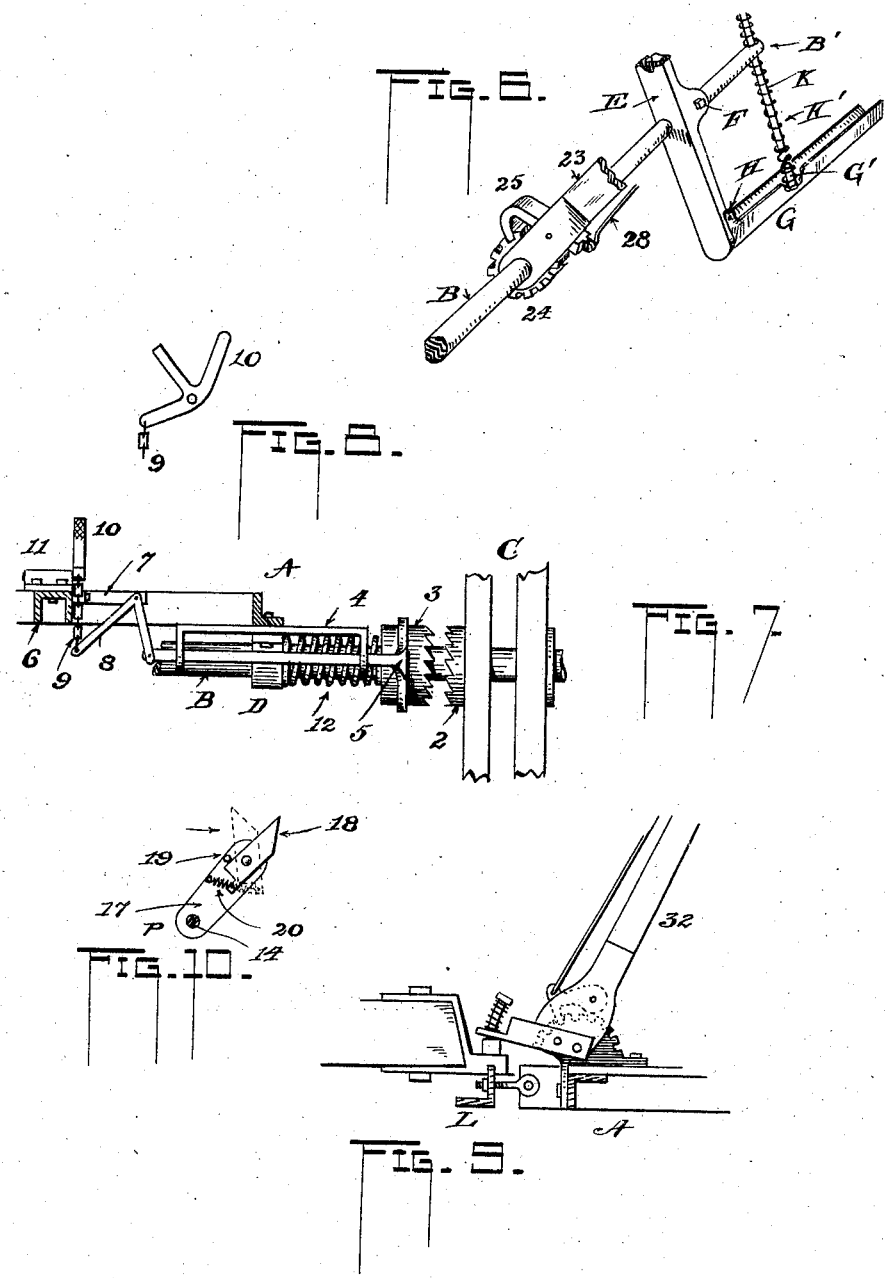

THOMAS A. McKEE, OF PEORIA, ILLINOIS, ASSIGNOR OF THREE-FOURTHS TO FRANK M. NICHOLS AND ONE-FOURTH TO FRANK H. LOWE, OF PEORIA, ILLINOIS.

CORN-PLANTER.

No. 845,808.     Specification of Letters Patent.     Patented March 5, 1907.

Application filed February 27, 1905. Serial No. 247,637.

*To all whom it may concern:*

Be it known that I, THOMAS A. McKEE, a citizen of the United States, residing at Peoria, in the county of Peoria and State of Illinois, have invented certain new and useful Improvements in Corn-Planters; and I do hereby declare that the following is a full, clear, and exact description of the invention, which will enable others skilled in the art to which it appertains to make and use the same.

This invention has reference to corn-planters, and has for one of its objects to provide a new mechanism for planting corn in hills or drilling it, as may be desired.

The invention has also for its object to improve the devices on implements of this class known as "markers."

A further and important object lies in the provision of means for dropping the seed into the shank beneath the seedboxes, said means being removable at will in an easy and simple manner.

A still further object of the invention is to provide a lever mechanism by which the markers and the seed-delivering means can be operated simultaneously, as will be hereinafter fully described.

Still another object is the provision of a disk or cutter of peculiar form to precede the shank of the planter.

In addition to the above certain details of construction are also new and novel and will be pointed out hereinafter.

In the appended drawings, Figure 1 is a top view of the planter as I prefer to construct it. Fig. 2 is a side elevation of the planter. Fig. 3 is a vertical section of the planter-shank and its seed-dropping devices. Fig. 4 is a horizontal section of certain seed-dropping members, showing the seedbox in broken lines. Fig. 5 is a perspective view of a furrow closing and covering arrangement. Fig. 6 is a perspective view of a portion of one of the markers of the planter, showing ratchet-and-pawl means for adjusting said marker. Fig. 7 is a rear elevation of a clutch mechanism. Fig. 8 is a side view of a foot-trip device for operating the said clutch. Fig. 9 is a side elevation of a lever-and-ratchet device for raising and lowering the planter-frame which carries the seedboxes, and Fig. 10 is a side view of an arm and trip used on the rock-shaft which operates the seed-dropping valve in the shank of the planter.

In the figures, A indicates the main or wheel-frame of the planter, carried by means of the axle B and the wheels C, the axle being free to turn within the boxings D of the frame and the wheels also free to turn on the axle. The said axle projects through and beyond each wheel, as shown, and outside each wheel and adjacent to it is a cross-arm E, secured to the axle by means of a set-screw F or other good means, whereby said arm is made rigid with the axle. To each end of the arm E is pivoted a horizontal arm G, as shown, the latter being constructed, preferably, of angle-iron, as in Fig. 6. It will be noted that said arms G have transverse extensions H, the extremities of which form the pivotal connection with the said cross-arm E. It is also to be noted that the cross-arm has an extension J at each end beyond the point of pivotal connection, so that the apex of the arm G will contact with it and prevent said arm moving outward too far. The extension B' of the axle carries a cross-arm K, each extension of which is provided with a coil-spring K'. The springs K' are designed to be compressed between the arms G and the shaft extension B', the ends thereof, bearing against the said arms G, being held by a lug G' on the latter. The cross-arm E is of a length equal to the diameter of the wheels C, so that the pivotal end of the arms are substantially at the greatest diameter of said wheels. As shown in Fig. 1, the outer or free ends of the said arms are farther apart than their pivoted ends, the springs keeping them normally in that position, the purpose of which will be explained later.

Pivoted to the front of the main frame A is a seedbox or front runner-frame L, to the extremities of which are secured the seedboxes M and the usual shanks N for receiving the seed from the said boxes. As illustrated in Fig. 3, the contracted or hopper-shaped bottom of the seedbox and the upper portion of the shank N are recessed in order to admit a revoluble cup-shaped member O, a cross-section (horizontal) of which is shown in Fig. 4. One side of the circular recess thus constituted is open, such opening being at the outside of the planter, as shown in Fig. 2. The inner or opposing walls of the seedboxes and shanks are closed by the walls M' and N', respectively, the same joining at the middle. Extending through both seedboxes is a shaft P, which lies at the center of the recesses just described, the walls M' N' forming the bearings therefor. The member O, before mentioned, has an opening O' through its wall, by which it can be run upon the shaft P, so that the rim thereof can enter the recess, as shown by dotted lines in Fig. 4. A collar P' on the shaft holds the rim away from the walls M' N', so that there will be no friction from that source. When placed upon the shaft, the member O is held by means of a nut $O^2$ or other suitable device, as will be understood. The said member O extends up into the seedbox, as in Fig. 3, so that the corn will cover it, and an opening in the rim at $O^3$ at intervals admits one kernel of corn, while frictionally resting upon said rim is a cut-off Q for keeping the opening cleared of all corn but that contained in said opening. Cast with the wall M' of the seedbox is a semicircular rim R, fitting smoothly within the member O. Also cast with the wall N' of the shank are continuations S of said rim, and secured within one of the latter continuations is a spring T of substantially the form shown, the free end of which is designed to enter each opening $O^3$ as said opening reaches said free end. The purpose of this is that each kernel is ejected from its opening by the spring, so that the operation of dropping the corn is positive. It will be understood from the construction and what has been said that the member O may be withdrawn from its position within the recess by removing the nut $O^2$ from the shaft, so that interior repairs may be readily made without taking the machine apart and with the added advantage that a similar member may be substituted for the one removed and which may have a greater or less number of openings in its periphery for receiving the grains of corn. The collar P' on the shaft, together with the nut $O^2$, serve to firmly hold the said member O, so that it must revolve with the shaft P. Unlike other devices of this nature of which I am aware, the outer flat surface of the member O is flush with the side of the shank N, and arranged in this manner no projections are presented which are liable to be struck and injured. The shank N has a throat at $N^2$ opposite the free end of the spring T for receiving the ejected kernel from each of the openings $O^3$, from whence the said kernels descend into the shank and are arrested near the outlet by a valve U, whose closed position is indicated by dotted lines; but this will be described presently.

On the shaft P is carried a sprocket-wheel V, and in line with it on the axle B is a similar one V', but somewhat larger, and a sprocket-chain W runs between them, as indicated, both the wheels being affixed to their respective shafts. The hub 2 of one of the wheels C is serrated at its end after the manner of a ratchet-wheel, while adjacent to it is a collar 3, shiftable along the axle B, but prevented from turning thereon by any suitable means. (Not shown.) Attached to the frame A above the axle is a yoke 4, Fig. 7, whose extremities support a horizontally-shiftable fork 5, which is adapted to engage the said collar 3, whose end adjacent to the hub 2 is also serrated or toothed to correspond with and engage the said hub. On the middle beam 6 of the frame A is secured a rigid arm or extension 7, to whose free end is pivotally attached a bell-crank 8, one end having loose connection with the fork 5 and the other end having a chain or other loose connecting device 9, which is also attached to a trip or lever 10, having a bearing at 11 on the frame member 6, before mentioned. Evidently by rocking the trip 10 on its pivot the bell-crank will also be rocked, with the result that the fork 5 will be shifted in the direction of its length to shift the collar 3. A spring 12 on the axle between the said collar 3 and the boxing D will keep the collar in engagement with the hub 2; but pressure on the said trip 10 will compress the spring and release the engaging members, as will be understood. In operation the wheel C adjacent to the clutch mechanism just described serves to revolve the axle B through the clutch, thereby imparting motion to the sprocket-wheel V', the chain W, and sprocket-wheel V on the shaft P. This causes the seed-delivering member O in the shank N to turn and deliver the corn kernel by kernel into the shank, as described.

At the rear of both shanks N and carried thereon by bearings 13 (but one of which is shown) is a rock-shaft 14, carrying at each end an arm 15. (Only one being shown in Fig. 3.) To each arm is attached a rod 16, the lower end of which is loosely connected with the valve U in the bottom of the shank N. An arm 17 is also carried on the rock-shaft close to the chain W and has a trip or dog 18, Fig. 10, pivoted thereto, which is free to tilt in one direction, but limited in the other by a pin 19. A spring 20 normally holds the dog against the said pin, as shown in the figure referred to. The chain W is provided at regular intervals with projecting members 21, Fig. 1, and as the chain moves toward the arm 17 in the direction of the arrow in Fig. 10 each said member 21 meets the said arm, or rather its dog 18, and moves it to rock the shaft 14, with the result that the valve U is opened to drop the corn held thereby. A spring 22, attached to the arm 15 and the shank at $n$, normally holds the said valve U closed and the arm 17 in position to be moved by the chain.

As one of the purposes of my invention is to plant the corn without the use of the check-row wire, I provide the chain-and-sprocket mechanism described driven by the carrying-wheels by which the corn is dropped at the usual regular intervals. The markers G at each side of the planter turn with the wheels, the latter being of a circumference which when a full revolution is made will cover a distance of three feet six inches, and at each full revolution the markers G G will indicate in the earth the position for the planting of the succeeding row and upon which the marker must travel in recrossing the field. Now at each full revolution it is designed that the projections 21 on the sprocket-chain will open the valves U to drop a hill of corn, the said projections being so spaced apart as to drop the corn at these periods. However, the same result could be obtained by making the wheels C of any size and varying the relative sizes of the sprocket-wheels V and V' or the spacing of the projections 21 on the chain, as may be understood. As the markings are made as the planter traverses one row across the field, those marks are visible when the planter recrosses the field for planting the next row. The operator therefore sees to it that the markers fall upon these depressions, so that the resulting planting shall be in line with those first dropped. Any variations occurring by reason of the uneven places in the surface of the ground are corrected by the use of an adjusting-lever 23, (shown in Fig. 6,) the lower end being loosely held on the axle B and bifurcated to form a fork, as in Fig. 1. Between the extremities of the fork is a toothed wheel 24, secured to said axle, and secured between the said extremities of the lever is a pivotal latch 25, held normally free of the wheel by means of a spring 26 between the latch 27 and the handle of the lever, (see Fig. 2,) there being a rod 28 connecting the said latch 27 and the rear end of the latch 25 for this purpose, and also that the wheel may be engaged at any time at the will of the operator. In planting if the markers do not fall upon the depressions previously made or are in such a position during revolution that the operator at once sees that they will not register with said depressions his foot is placed upon the trip 10, and the serrated collar 3 is disengaged from the hub of the wheel C and simultaneously grasps the lever 23, depressing the latch 25 in so doing to engage the wheel 24. This action releases the axle B from the driving-wheel C and places said axle under the control of the operator. Since the markers are secured to the axle, a movement of the lever will turn the shaft and the markers to a position where as the bottom of the wheels C come opposite the mark in the ground the markers will likewise be found at that position, at which time one of the projections 21 on the chain opens the valve U to drop the corn, the hill thus dropped being in perfect line with the one planted when the machine first crossed the field. Sitting in his seat the operator very readily finds what the position of the markers must be to reach the ground at a certain time and point, and the lever 23 makes it possible to instantly find that position. After this operation is accomplished and simultaneously therewith the collar 3 is released, and the spring 12 will instantly return it to the hub with which it engages, and the planting proceeds as before. The spacing of the projections 21 on the chain W is such that as each marker meets the ground the valve U is opened, so that it is always known when the marker is adjusted to meet the ground at a certain point. The corn is likewise dropped at that time.

Forward of the shank N is a cutter or disk of peculiar form and is shown in Figs. 1 and 2. It comprises a cutting-flange 27', designed to cut several inches into the ground, and a body convexed at both sides, as at 28', to form a limiting-stop to further entrance into the ground than the cutting edge or flange 27' goes. A further advantage in this form of disk is that when the ground is cut the convexed sides press the earth at both sides to better open a passage-way for the shank which follows. This makes a better opening for receiving the seed and insures a more uniform depth in planting. Immediately following the shank are two members for closing the dirt over the corn to close the furrow cut. These members are shown in Fig. 5, each being denoted by the numeral 29, being formed with flaring projections 30 adjacent to the shank, so as to gather the outlying earth toward and between them. The bodies of the said member gradually approach each other, so as to force the dirt fully over and upon the corn. The rear upwardly-projecting ends of the members are attached to a rod 31, supported from the frame L, as in Fig. 2, the forward ends having rigid connection with the shank, as shown. I illustrate in Fig. 9 a lever 32 for adjusting the front frame of the planter for height; but this is substantially the same as is used in all such implements and needs no description here. I provide also the usual scrapers at 33, secured to a rock-shaft 34 at the rear of the frame A, and this is operated by the customary foot-lever at 35; but these portions will not need further description, since they are common to planters.

If desired to plant corn three kernels at a time, a member having three openings is used in the seedbox and shank, as shown in Fig. 3; but if two kernels are wanted a member having two openings is employed. In other words, a member must be used having the number of openings corresponding to the number of kernels to be planted, a full revolution of the member occurring to each opening of the valve U in the shank. If it is desired to drill the corn or use the planter for other grains, the valves U are merely secured in an open position, so that the grain will fall from the member O directly into the furrow opened to receive it.

The markers G G are made of considerable length, so that they will reach well over toward and into the path of the planter in its next trip across the field. Thereby the operator always has the marking where it can be readily seen. By having a yielding pressure on the ground the markers will give, when striking a hard substance, without throwing the planting out of line.

Various changes may be made in my planter without departing from the spirit and intent of the invention.

I claim—

1. In a corn-planter, the combination of the planter-frame and its seed-dropping mechanism comprising the seedboxes and seed-tubes thereunder, a removable rotary cup-shaped member partially within each box and each seeding-tube and removable therefrom at the side of the planter, the axle and carrying-wheels, the latter being free to turn on the axle, said axle being free to turn in its bearing on the frame, means for operating the seeding devices from said axle when the latter turns, clutch mechanism for locking one of the wheels to the axle consisting of a toothed member on the wheel-hub, a member on the axle and adapted to shift along the same and also to turn therewith and adapted also to engage the wheel-hub member, a member for operating the shiftable member, a foot-lever connected with said operating member, a spring for holding the clutch member in engagement with the toothed member, the foot-lever adapted for locking the clutch members apart against the pressure of the spring when not planting corn substantially as set forth.

2. In a corn-planter, the combination of the frame, an axle carried thereby and free to turn in its bearings on said frame for the purposes set forth, carrying-wheels loosely mounted to revolve on the axle, a clutch mechanism for locking the wheel and axle together, a lever for controlling such mechanism for the locking operation, by foot-pressure, a spring for holding the clutch mechanism in engagement, the said lever adapted for holding the clutch member in an inoperative position against the pressure of the spring for the purposes explained, seedboxes and runner-shanks on the frame, a revoluble shaft for operating the dropping mechanism within the boxes, a valve in the shank for pocketing the seed within the latter, a rock-shaft for opening and closing said valve, a lever on the rock-shaft for oscillating the said rock-shaft, a sprocket-chain for turning the revoluble shaft which operates the seeding mechanism, the same being driven from the planter-axle, and a series of members carried by said shaft for moving the said lever at regular intervals substantially as set forth.

3. In a corn-planter the combination of the planter-frame having the axle, wheels and seed-dropping mechanism, a marking device on each end of the axle comprising a cross-arm secured to the axle at right angles thereto, an arm pivoted to each end of the cross-arm, each arm being substantially parallel to the axle, and spring interposed between the arms and exerting pressure directly thereagainst in a direction at right angles to their lengths for holding them normally outward for the purposes stated, said arms being limited in the extent of outward movement due to said springs.

4. In a corn-planter the combination of the planter-frame having the wheels and revoluble axle, the wheels also revoluble on said axle, marking devices secured to the axle, seedboxes and runner-shanks carried on the frame, changeable and revoluble seeding devices within the boxes, a valve in each shank for catching the seed as it is delivered from the seedboxes, a shaft for operating the said revoluble seeding devices and to which the latter are removably secured, a sprocket-wheel on the planter-axle, a sprocket-wheel on the said shaft, a sprocket-chain on the two sprockets for driving the shaft from the axle, a rock-shaft adjacent to the sprocket-chain for operating the valves in the shanks from said chain, a series of projections on the chain, a lever on the said rock-shaft with which the said projections engage for the purposes set forth, foot-lever mechanism for connecting the axle from the wheels to stop the revolution of the shaft and consequent dropping of seed, a hand-lever for rocking the axle independent of the wheels and frame for changing the position of the markers for the purposes explained, and a trip device pivoted on the rock-shaft for permitting the projections on the chain to pass said lever in a backward direction without moving the rock-shaft, while permitting the rocking of the axle in the desired direction all for the purposes set forth.

5. In a corn-planter the combination of the seedbox and the shank upon which it is mounted, the seedbox having a circular recess at one side but closed at the other side, the recess being partially within each of the members described, a rim formed integrally with the seedbox and extending into the recess and creating an annular space between the wall of the recess and itself as shown, a removable seed-cup within the recess the same having a perforated rim, said rim adapted for entering the annular space the said integral rim being inclosed thereby, the cup being partially within the box and partially within the shank, its upper-rim surface being exposed in the seedbox, the vertical closed side of the cup being substantially flush with the outside surface of the shank, a driving-shaft for the cup the same extending centrally therethrough and to which the cup is removably but positively secured to be positively driven thereby, a spring cut-off member within the seedbox for the purposes explained, and a seed-ejecting spring within the seed-cup and secured to the stationary rim for entering the perforations in the rim of the cup for positively ejecting the seed from said cup.

6. In a corn-planter the combination of the seedbox and the shank upon which it is mounted, the seedbox having a circular recess at one side but closed at the other side, the recess being partially within each of the members described, a rim formed integrally with the seedbox and extending into the recess and creating an annular space between the wall of the recess and itself as shown, a removable seed-cup within the recess the same having a perforated rim, said rim adapted for entering the annular space, the said integral rim being inclosed thereby, the cup being partially within the box and partially within the shank, its upper-rim surface being exposed in the seedbox, the vertical closed side of the cup being substantially flush with the outside surface of the shank, a driving-shaft for the cup the same extending centrally therethrough, a collar affixed to the shaft within the recess against which the cup bears, the end of the shaft outside the collar having screw-threads, and a nut adapted to screw thereon against the said cup to positively hold it in place, a spring cut-off device within the seedbox to engage with the seed-cup for the purposes explained, and a seed-ejecting spring within the seed-cup and secured to the stationary rim for entering the perforations in the rim of the cup for positively ejecting the seed from said cup.

7. In a corn-planter, the combination of the seedbox M and shank N, there being a single circular recess in the outside wall of the box and shank the said recess being partially in each member described, a single seed-cup O having an annular rim, provided with the perforations O³, adapted to enter the said recess, a stationary rim R integral with the seedbox and concentric with and arranged within the cup O when the latter is in working position within its said recess, the upper portion of the cup being exposed within the seedbox M for receiving seed in perforations O³, a spring cut-off Q for engaging with the rim of the cup within the seedbox as described, a spring seed-ejecting member T within the seed-cup and affixed to the stationary rim R, a driving-shaft P central of the recess, a collar P' thereon against which the cup is secured in a positive manner and a threaded nut O adapted to run upon the end of the shaft to secure said cup in position and also for permitting its removal in the manner described and shown.

8. A furrow-opener comprising the circular double convexed metal body 28' and revoluble in a vertical plane, the axis on which it revolves passing through the centers of the convexed surfaces, the flat annular rim 27 surrounding the periphery of the body at its longest circumference, said rim extending from said body substantially a distance equal to one-third the length of the radius of said body, said body suddenly receding from the rim as shown, the seedbox-shank N immediately and curved forward and extending partially beneath the said furrow-opener and partially conforming to the circular form of the latter, and a furrow-closing device rearward of and secured to the shank consisting of the pair of opposite curved plates 29 separated at the bottom, the forward, downward and outwardly curved extensions 30 and the rearward and upwardly curved rear extremities of said plates approaching one another, and the supporting member 31 to which such rear ends are attached.

9. In a corn-planter, the axle thereof and a marker carried at each end thereof comprising a cross-arm thereon adjacent to the wheel and corresponding in length to substantially the diameter of the wheel, an arm at each end of the cross-arm, the same being pivoted thereto, the pivots of each arm being removed from the axis thereof inward toward the axle substantially as shown to limit the outward movement of the arm, and springs interposed between the pivoted arms for exerting pressure directly against and at right angles to the length of the same.

10. In a corn-planter, the axle thereof and a marker carried at each end thereof comprising a cross-arm thereon adjacent to the wheel and corresponding in length to substantially the diameter of the wheel, an arm at each end of the cross-arm, the same being pivoted thereto, the pivots of each arm being removed from the axis thereof inward toward the axle substantially as shown to limit the outward movement of the arm, the extensions B' projecting from the wheel substantially parallel with the pivoted arms, and spiral spring positioned between the extensions and each said arm and maintaining a yielding pressure upon the latter directly at right angles to their lengths.

11. In a corn-planter the seedbox, a cross-frame for supporting it, the shank upon which the box and frame are supported, the frame lying between the two, a circular recess in the outer side of the box and shank, half of said recess being within the box and the other half within the shank substantially as shown, the opposite side of the box and shank being closed, a rim formed substantially in the arc of a circle and arranged within the recess concentric with and smaller than the recess, a seed-cup entered into the recess and closely fitting the rim, there being a series of seed-receiving holes in the rim of the cup, the outer surface of the cup being substantially flush with the wall of the shank and revoluble within the latter and the seed-box, a cut-off member within the seedbox beneath which the holes of the seed-cup pass for the purposes set forth, seed-ejecting means in the lower portion of the rim, and a shaft positioned centrally within the recess on which the seed-cup is positively but removably secured.

In testimony whereof I affix my signature in presence of two witnesses.

THOMAS A. McKEE.

Witnesses:
E. J. ABERSOL,
MAE DAVIS.